United States Patent [19]

Moody

[11] Patent Number: 4,932,021

[45] Date of Patent: Jun. 5, 1990

[54] PATH LEARNING FEATURE FOR AN AUTOMATED TELEMARKETING SYSTEM

[75] Inventor: Taryn S. Moody, Eatontown, N.J.

[73] Assignee: AT&T Bell Laboratories, Murray Hill, N.J.

[21] Appl. No.: 332,066

[22] Filed: Apr. 3, 1989

[51] Int. Cl.$^5$ .............................................. H04L 11/00
[52] U.S. Cl. ....................................... 370/54; 370/62; 379/97
[58] Field of Search .................... 370/54, 60, 62, 94.1, 370/94.3; 379/67, 84, 88, 97; 340/825.02, 825.06, 825.15

[56] References Cited

U.S. PATENT DOCUMENTS

| | | | |
|---|---|---|---|
| 4,425,627 | 1/1984 | Eibner | 364/900 |
| 4,531,186 | 7/1985 | Knapman | 364/300 |
| 4,660,166 | 4/1987 | Hopfield | 364/807 |
| 4,680,729 | 7/1987 | Steinhart | 364/900 |
| 4,689,737 | 8/1987 | Grant | 364/200 |
| 4,727,473 | 2/1988 | Anderson et al. | 364/188 |
| 4,805,166 | 2/1989 | Ardon et al. | 370/54 |
| 4,812,843 | 3/1989 | Champion, III et al. | 364/436 |
| 4,845,739 | 7/1989 | Katz | 379/67 |

OTHER PUBLICATIONS

*Joint National Conference on Major Systems*, "A Mathematical Programming Model . . . ", M. R. Belgard et al., vol. 19, Supmt. 2, Fall 1971, p. B–284.
*IBM Technical Disclosure Bulletin*, vol. 20, No. 2, Jul. 1977, "Path Entity Recording", C. J. Prokop et al., p. 479.
*IEEE Communications Magazine*, vol. 23, No. 2, Feb. 1985, "An Interactive Touch Phone for Office Automation", T. R. Hsing et al., pp. 21–26.
*Telesis 1985 two*, R. Bloeden et al., "Touchphone: a New Generation in Telephone Design", pp. 22–25.
*IBM Technical Disclosure Bulletin*, vol. 28, No. 10, Mar. 1986, "System Learning Program", pp. 4383–4384.
Digital Equipment Corp. Publication, "DECvoice Advanced Over-the-Telephone Information Access", 1988.
*Comput. Educ.*, vol. 12, No. 1, "The Development and Evaluation of a Learning-by-Browsing System on the Macintosh", J. T. Mayes et al., pp. 221–229.

*Primary Examiner*—Douglas W. Olms
*Assistant Examiner*—Melvin Marcelo
*Attorney, Agent, or Firm*—Frederick B. Luludis

[57] ABSTRACT

In a telemarketing system in which responsive to system prompts a user selects a particular path through the system to peach a desired service offering, the present invention "learns" the path that the user repeatedly selects over a period of time and thereafter gives the user the option of advancing to the end point of that path without the user having to listen and respond to the system prompts.

8 Claims, 7 Drawing Sheets

FIG.2

| PASSWORD (a) | 1 (b) | 1 (c) | 5 (d) | |
|---|---|---|---|---|
| | COUNTER (e) | COUNTER (f) | COUNTER (g) | |

FIG.4

| PASSWORD (a) | 1 (b) | 1 (c) | 5 (d) | 6 (i) |
|---|---|---|---|---|
| | COUNTER (e) | COUNTER (f) | COUNTER (g) | COUNTER (j) |

FIG.5

| PASSWORD | 1 | 1 | 1 | 5 | 6 |
|---|---|---|---|---|---|
| | COUNTER | COUNTER | COUNTER | COUNTER | COUNTER |

FIG.6

| PASSWORD | 1 | 2 | | 1 | 3 | | 5 | 4 | |
|---|---|---|---|---|---|---|---|---|---|
| | $e_1$ | $e_2$ | $e_3$ | $f_1$ | $f_2$ | $f_3$ | $g_1$ | $g_2$ | $g_3$ |

Groups: b = ($e_1, e_2, e_3$), c = ($f_1, f_2, f_3$), d = ($g_1, g_2, g_3$)

PATH LEARNING FEATURE FOR AN AUTOMATED TELEMARKETING SYSTEM

TECHNICAL FIELD

The invention relates to computerized telemarketing systems, and more particularly to a system/user interface for use in such systems.

BACKGROUND OF THE INVENTION

Automated telemarketing systems use programmed voice instructions to handle telephone calls desiring information concerning, for example, financial reports, airline schedules, stock and bond quotations, etc. In essence, and automated telemarketing system is a tree-like structure having a hierachy of nodes each branching out to other nodes, or services. A caller is "talked" through a path starting at a root node, through several intermediate nodes and thence to the desired service. This is done by providing at each node a prerecorded verbal description of the services offered by the next branch of nodes. A caller selects each step in the path by inputting via his/her telephone a digit associated with the next node that the user desires to reach.

The complexity of an automated telemarketing system/user interface is geared to the type of services that the system provides. For example, in a simple automated telemarketing system providing banking services, a caller may only need to deal with one or two levels of prerecorded menus to reach a desired service point. However, in a complex automated telemarketing system providing, for example, stock and bond quotations, a caller may have to deal with four or more levels of prerecorded menus to reach a desired service point.

Human factors studies show that most callers are reluctant to deal with three or more levels of prerecorded menus and are more reluctant to do so when each menu contains four or more service announcements. To deal with this problem, some callers memorize the sequence of digits that they enter to reach a particular service point. Thereafter, they enter a digit of the sequence when reaching a respective node, or menu level to prelude having to listen to a litany of menu items.

SUMMARY OF THE INVENTION

The user/automated telemarketing system interface is improved by arranging the system so that it develops a profile defining a customized service path for a user who repeatedly uses the system. The customized path consists of the series of nodes and links that the user previously traversed to reach a desired service. Thereafter, when the user accesses the system he/she is given the option of being immediately connected to the service path defined in the user's profile. Specifically, each node in a customized path is assigned a weight, which is used as a measure of the probability that the user will follow a path leading to that node the next time that the user accesses the telemarketing system. The weights that are assigned to the nodes are updated as the user continues to use the system. Once the weight of each node in a series of nodes listed in the user's profile exceeds its respective threshold, then the user is given the option of immediately advancing to the last node in that series. Thus, the last node in the series could be either an intermediate node of a partial customized path or the end node of a fully customized path at which the desired service is provided.

BRIEF DESCRIPTION OF THE DRAWING

FIG. 2 illustrates one version of a user record that is maintained by the system of FIG. 1 to learn the path repeatedly selected by the user over a period of time;

FIGS. 4–6 illustrate other versions of a user record;

DETAILED DESCRIPTION

Figure 1:
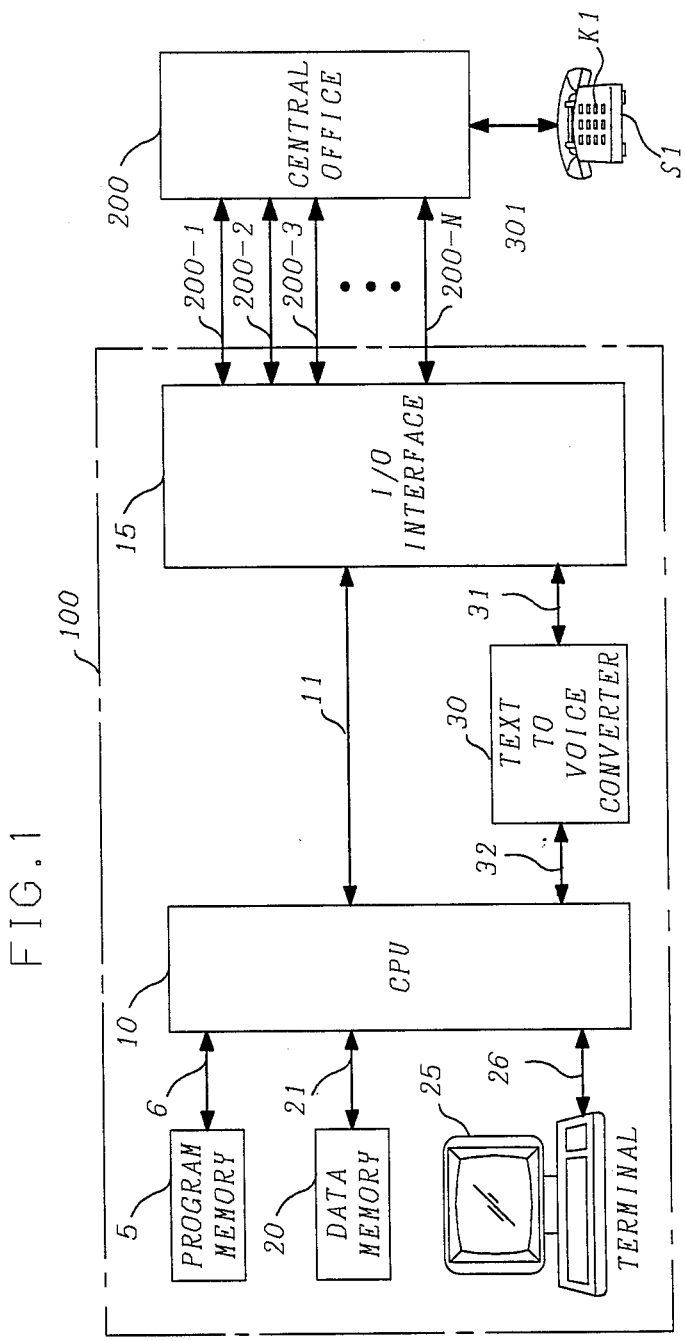
FIG. 1 is a broad block diagram of a telemarketing system in which the invention may be advantageously practiced.

FIG. 1 shows a block diagram of an automated telemarketing system 100 which combines the usual system features with the present invention. At the heart of system 100 is central processing unit (CPU) 10, which may be, for example, the AT&T 3B2 computer. CPU 10 operating under the control of a system program stored in memory, or ROM, 5 implements the various telemarketing features and functions provided by system 100. In doing so, CPU 10 makes use of data that it has stored in memory, or RAM, 20, as will be discussed below.

System 100 also includes text-to-voice converter 30, which may be, for example, the DECvoice Response system available from the Digital Equipment Corporation (DEC). Converter 30 operating at the direction of CPU 10, unloads digitized text stored within the memory of converter 30 and converts the text into respective voice signals. The voice signals are then outputted to bus 31. The text that is stored in the memory (not shown) of converter 30 represents various phrases as well as menu items provided at each node of a telemarketing system implemented by system 100. Such text is inputted and kept current by a system administrator operating terminal 25 connected to CPU 10 via bus 26.

For example, the administrator may input via terminal 25 the identity of a node within the telemarketing system and the text of the menu items that will be announced at that node. CPU 10, in turn, supplies the text to converter 30 via bus 32. Converter 30 stores the text in its internal memory, and returns to CPU 10 via bus 32 the memory address at which the text is stored in digital form. CPU 10 then stores the address together with the identity of the associated node in data memory 20. Thereafter, all that CPU 10 needs to do to output the analog representation of a menu of items to bus 31 is to pass to converter 30 the address of the converter 31 memory location at which the digitized text is stored.

System 100 further includes I/O interface 15, which connects to central office (CO) 200 via a plurality of telephone lines 200-1 through 200-N. I/O interface 15 contains well-known switching, network control and telephone port circuits required by system 100 to proces telephone calls received from a system user via one of the telephone lines 200-1 through 200-N. The manner in which a system user, such as a user positioned at station S1, establishes a telephone connection to system 100 is well-known and will not be discussed herein. However, it suffices to say that the user establishes such a telephone call by first activating station S1 (i.e. going offhook), and then dialing the telephone number associated with system 100 using keypad K1. Central office 200 responsive to receipt of the telephone number establishes a telephone connection between station S1 and one of the telephone lines 200-1 through 200-N. (It is noted that telephone lines 200-1 through 200-N may comprise what is commonly referred to as a hunt group. That is, the telephone lines in a hunt group share a common telephone number. Thus, a telephone call may be connected to any idle line of the hunt group of telephone lines, such as, for example, telephone line 200-1.)

When CO 200 seizes line 200-1, an I/O interface 15 port circuit associated with that line alerts CPU 10 via bus 11, the alert being in the form of a message noting the seizure, or incoming call, on line 200-1. CPU 10 answers the incoming telephone call by (a) retrieving from data memory 20 the address of the converter 30 memory location at which a predetermined salutatory phrase, or announcement, is stored; (b) passing the address and appropriate instructions to converter 30; and (c) causing bus 31 to be effectively connected to the port circuit associated with line 200-1. Converter 30, in turn, unloads the digitized version of the announcement from its memory, converts it to voice signals and outputs the signals to bus 31 for transmission to the user. The text of the announcement that is sent to the user may state, for example:

"Welcome to the XXXX system, please     (1)
enter your system password."

The user at station S1 responsive to the announcement enters his/her password via keypad k1, in which the password may be, for example, a particular series of numbers (digits).

The port circuit associated with line 200-1, in turn, passes to CPU 10 via bus 11 each digit of the sequence that it receives. CPU 10 forms the digits into a series of digits by adding the latest digit received from the port circuit to the previously formed series, or sequence. It is recognized that the series contains only one digit upon receipt of the first digit of the password. When the series of digits is formed, CPU 10 unloads from a memory 20 location indirectly identified by the received password a record consisting of a number of fields defining the user's profile, as shown in FIG. 2.

Specifically, the first field "a" of the record is used to store the user's password. The remaining fields of the record, namely fields "b", "c" and "d", are used to store the respective identities of the system nodes previously selected by the user to reach a particular service offered by the automated telemarketing system that system 100 implements.

Briefly, an automated telemarketing system is a tree-like structure, in which the first, or root node, branches out to a number of other nodes, referred to herein as the first level. Each node of the first level of nodes branches out to a number of second-level nodes, and similarly, each of the second-level nodes branches out to a number of third-level nodes, and so on. In the following discussion, for the sake of brevity and clarity, it will be assumed that the automated telemarketing system that system 100 implements is a three-level structure, in which the various services are provided at the third level.

Accordingly, CPU 10 inserts in field "b" of the record the identity of the node that the user selects at the root, or first, level. CPU 10 then inserts in fields "c" and "d" the nodes that the user selects at the second and third levels, respectively. It is seen that the numbers 1, 1, and 5 have been inserted in those fields, thereby identifying one possible path previously selected by the user to reach a desired service. The user's record also contains a number of counters "e", "f" and "g" associated with respective ones of the nodes fields "b", "c" and "d". CPU 10 uses these counters to track the number of times that the user selects the associated nodes to reach a desired service. As a result of such tracking, CPU 10, in accordance with the invention, is able to define a customized path for the user who repeatedly uses the telemarketing system.

For example, the sequence of digits 115 illustrated in FIG. 2 define a customized path if the contents of their associated counters equal or exceed respective predetermined thresholds. Thus, when the record is retrieved from memory 20, CPU 10 compares the contents of each counter with a respective predetermined threshold prescribed by the system administrator, beginning with the first counter "e". If CPU 10 finds that the contents of each counter equals or exceeds its respective threshold, then CPU 10 advances the user to an announcement inquiring when the user desires to be connected to the service provided at node 5.

If, on the other hand, CPU 10 finds that the contents of one of the counters, e,g., counter "g", does not at least equal its respective threshold, then CPU 10 connects the user to an announcement inquiring whether the user desires to be connected to the node and level associated with the next preceding counter, e.g. counter "f", assuming that the latter counter equals or exceeds it's respective threshold. It is understood of course that the user is connected to the root node of the telemarketing system if the contents of the first counter "e" does not at least equal its respective threshold. (It is noted that hereinafter the term "the weight of a node" will be taken to mean the value of the contents of the counter associated with the node.)

Thus, the user may be advanced to end point of the path identified by the (a) full sequence of stored digits (characters) when the weight of each character of the sequence at least equals its respective threshold, or (b) first N digits of the sequence when the weights of those digits at least equal their respective thresholds, but the remaining digits of the sequence do not, where $N \geq 1$.

Figure 3:
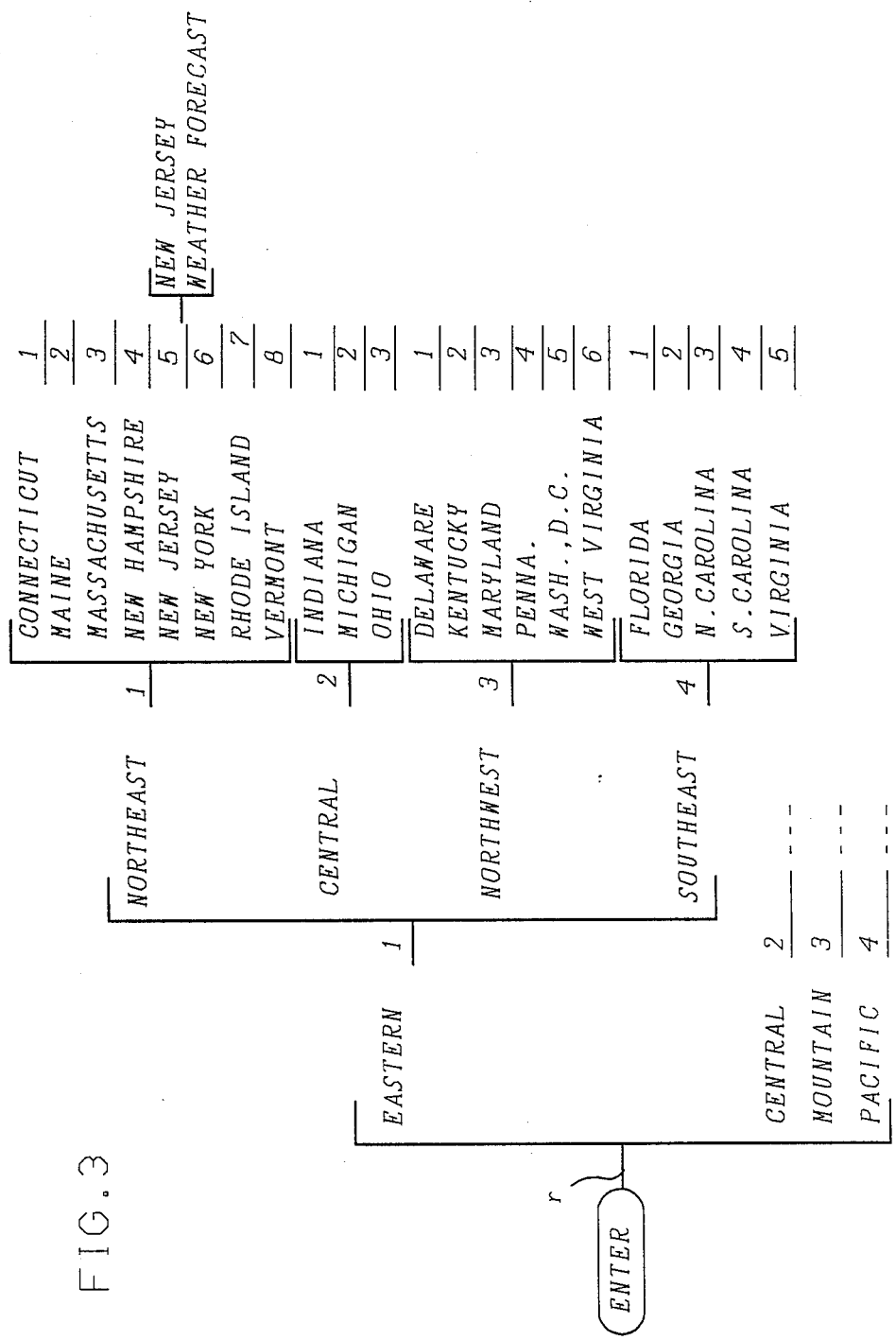
FIG. 3 illustrates the structure of a so-called three level telemarketing system.

The invention will now be discussed in the context of a fictitous three-level telemarketing system providing weather forecasts for a number of localities within the continental U.S., as shown in FIG. 3. In doing so, it will be assumed that the user's profile is the record shown in FIG. 2. As such, the series of numbers, 115, stored in that record define a path leading to a service offering providing a weather forecast for the state of New Jersey. It will also be assumed that the weight of each node in the path is less that its respective threshold. As such, when the user, for example, the user of station set S1 (FIG. 1), accesses the system, he/she will be connected to the root node "r".

The root node of the national weather service comprises four menu items, which are stored in the memory of converter 30 and which identify respective regions of the U.S., namely, the Eastern, Central, Mountain and Pacific regions. For the sake of brevity and clarity, only the nodes succeeding the eastern branch of the root node are shown in the FIG.

In particular, CPU 10 connects the user to the root node by directing converter 30 to unload from its memory the text defining the voice announcement that is delivered to the user at that node. As mentioned above, converter 30 unloads the text from its memory, converts the text to voice signals and supplies the result to bus 31 for delivery to the user via I/O interface circuit 15. The text of the voice announcement provided at the root node may state, for example:

> "For todays weather (2)
> in the Eastern region -- enter the digit
> 1; for the Central region -- enter 2; for
> the Mountain region -- enter 3; and for the
> Pacific region -- enter 4."

When CPU 10 completes that task, it then waits for the user to enter one of the digits called for by the preceding announcement. In the present example, the user at station S1 will enter the digit 1, since the locality of interest to the user (i.e. New Jersey) is located within the Eastern region of the U.S. Responsive to receipt of that digit, CPU 10 increments the counter "e" associated with field "b" of the user's record i.e., the first digit of the series 115. CPU 10 then advances the user to the selected node.

The action of advancing the user to a node means that CPU 10 causes the next voice announcement of menu items to be delivered to the user. CPU 10 does this by translating the received digit into an address identifying the memory 20 location containing the address of the converter 30 memory location at which the text of the pertinent voice announcement is stored. (The manner in which a number may be translated into a memory address is well-known and will not be discussed herein.) CPU 10, as mentioned above, passes the address to converter 30 so that the latter may convert the digitized text stored at that memory address into its voice equivalent for delivery to the user, in the manner described above. The text of the voice announcement that is delivered to the user at the current node may state, for example:

> "You have reached the weather service for (3)
> the Eastern region of the U.S.; for weather
> service in the Northeast area of the
> Eastern region -- enter the digit 1; for the
> Central area -- enter 2; for the
> Northwest area -- enter 3; and for the Southeast area --
> enter 4."

Since the locality that is of interest to the user is contained within the Northeast area, the user would enter, or press, the digit 1 on keypad K1. CPU 10 responsive to receipt of that digit increments the counter "f" associated with field "c" of the user's record, i.e., the second digit of the series 115. CPU 10 then advances the user to the system node identified by the path 11. CPU 10 does this by delivering to the user, in the manner described above, the voice announcement designed for the identified node. The text of the announcement that is delivered to the user at that node (11) may state, for example:

> "You have reached weather service for (4)
> the Northeast area of the
> Eastern region of the U.S.; for weather
> service for the State of Connecticut -- enter
> the digit 1; for the State of Maine -- enter 2;
> for the State of Massachusetts --
> enter 3"; and so on.

Thus, in the present example, the user would enter enter, or press, the digit 5 representing the State of New Jersey.

CPU 10 responsive to receipt of that digit advances the user to the desired node and increments the counter associated with field "d" of the user's record. As before, CPU 10 uses the series of digits (115) entered by the user as a means of identifying the converter 30 memory location containing the digitized text of the New Jersey weather announcement. Similarly, the address of the desired memory location is then passed to converter 30, which unloads the digitized text from its memory and supplies the voice equivalents thereof the bus 31 for transmission to the user, in the manner discussed above.

As mentioned above, CPU 10 increments a counter responsive to the user selecting its associated node. The value of the increment as well as the value of the respective counter threshold may be chosen based on the particular telemarketing application. For example, the telemarketing system administrator may elect to use a common increment for all counters, in which the value of the increment could be, for example, 10. The administrator may also elect to use a particular threshold value at each level of the telemarketing system. For example, the value of the threshold for the first, second and third levels of the system depicted in FIG. 3 may be set to, for example, 30, 40 and 60, respectively.

The reason for increasing the values of the thresholds as the number of the level increases is based on the notion that the probability that a user will repeatedly select the same node at a given level decreases as the level increases. Thus, it is (a) highly probable that a user would only be interested in the weather conditions occurring in the region that he/she lives or works in, hence the value 30 for first level; (b) slightly less probable that the user will repeatedly select the same area within a selected region, hence the value 40 for the second level; and (c) somewhat less probable that the user will repeatedly select the same state within a selected area, hence the value 60 for the third level. For example, a user who lives in one state, such as New Jersey, and works in another state, such as New York, may select a weather forecast for New Jersey on one occassion and New York on another occasion.

To handle this situation, CPU 10, in accordance with an aspect of the invention, customizes multiple paths for the user, as shown in FIG. 4. Specifically, the number series 115 and 116 each define a particular path (New Jersey and New York, respectively) selected by the user on previous occasions. Thus, when the user accesses the system and enters his/her password, CPU 10 retrieves the user's record and then tests the contents of each of the counters "e", "f" and "g", in the manner described above. If the contents of each of those counters at least equals its respective thresholds (e.g. 30, 40 and 60), then, in accordance with the invention, the user is given the option of bypassing the root node and immediately advancing to the end point of that path, i.e., weather service for New Jersey. The text of an announcement providing such an option may state, for example:

> "If you wish weather service for (5)
> New Jersey -- enter the digit
> one, otherwise -- enter the digit 2"

At the end of the announcement providing weather conditions for New Jersey, CPU 10 "checks" the user's record to see if it contains another, or second, path. CPU 10 similarly checks the user's record in the event that the weight of node "d" does not at least equal its respective threshold or the user enters the digit 2 in response to the foregoing option announcement. If the record contains another, or second, path, then CPU compares the weight of node "i" with its respective (e.g. the number 60). If the weight of the latter node is found to at least equal the number 60, then the user is given the option of immediately advancing to the end point of the path defined by the series 116, i.e., weather service for New York. The text of the announcement providing that option would be similar to the wording of the option announcement (5) described above.

In the event that the user's record does not contain a second path or if the weights of nodes "d" and "i" do not meet their respective thresholds, then the user may be advanced to an intermediate node in the path, in the manner described above.

As an aspect of the invention, the telemarketing system could be arranged as a multi-selection system. That is, a system which allows the user to select more than one item from a menu of services. For example, the user may enter the digits 1, 5 and 6 responsive to listening to the above-described announcement (4) as an indication that the user desires a weather forecast for the states of Connecticut, New Jersey and New York. The system responsive thereto would enter those digits in the user record as they are received, as shown in FIG. 5. Assuming that the weights of each of the nodes shown in the record of FIG. 5 at least equal their respective thresholds, then the user is advanced to node 111 at which point an announcement similar in form to the above announcement (5) is delivered to the user.

If the user enters the digit 1, then the systems advances the user to an announcement providing a weather forecast for Connecticut. At the end of the latter announcement or if the user had entered the digit 2, then an announcement similar to the abobve described announcement (5), is delivered to the user. If the user enters the digit 1, then the system advances the user to the desired service. Likewise, at the end of the latter service announcement, or if the user had entered the digit 2, then the user is given option of advancing to the service providing a weather forecast for New York. At the end of that service announcement, or if the user declines the latter option, then the system will inquire whether the user desires to select other items from the service level. The text of an announcement forming such an inquiry may state, for example:

> "For additional selections (6)
> --enter the digit 1; otherwise,
> ----enter the digit 2."

As another aspect of the invention, the telemarketing system may be implemented so that it allows a user to establish distinct multiple paths, as shown by the user record depicted in FIG. 6. In particular, the user record is segmented into—illustratively three—fields "b", "c" and "d" with each field comprising—three—subfields. Each of the subfields are associated with respective counters identified as $e_1$ through $e_3$, $f_1$ through $f_3$ and $g_1$ through $g_3$. It is seen from the record of FIG. 6 that on prior occasions the user has selected the path identified by the series 115 and on other, or the same, occasions selected another distinct path identified by the series 234.

Accordingly, when the user next accesses the system, he/she will be given the option of advancing to the end point of path 115, assuming that the weight of the nodes defined by that path exceed their respective thresholds. As before, if the user accepts the option, then the systems advances the user to the service point defined by the path. At the completion of the service point defined by the path. At the completion of the service offering (e.g., weather announcement) or if the user rejects the option, then the system gives the user the option of advancing to the end point of path 234. Similarly, the user may either accept or reject the latter option and proceed in the manner described above.

We turn now to a discussion of the software program which implements the invention in CPU 10.

Figure 7:
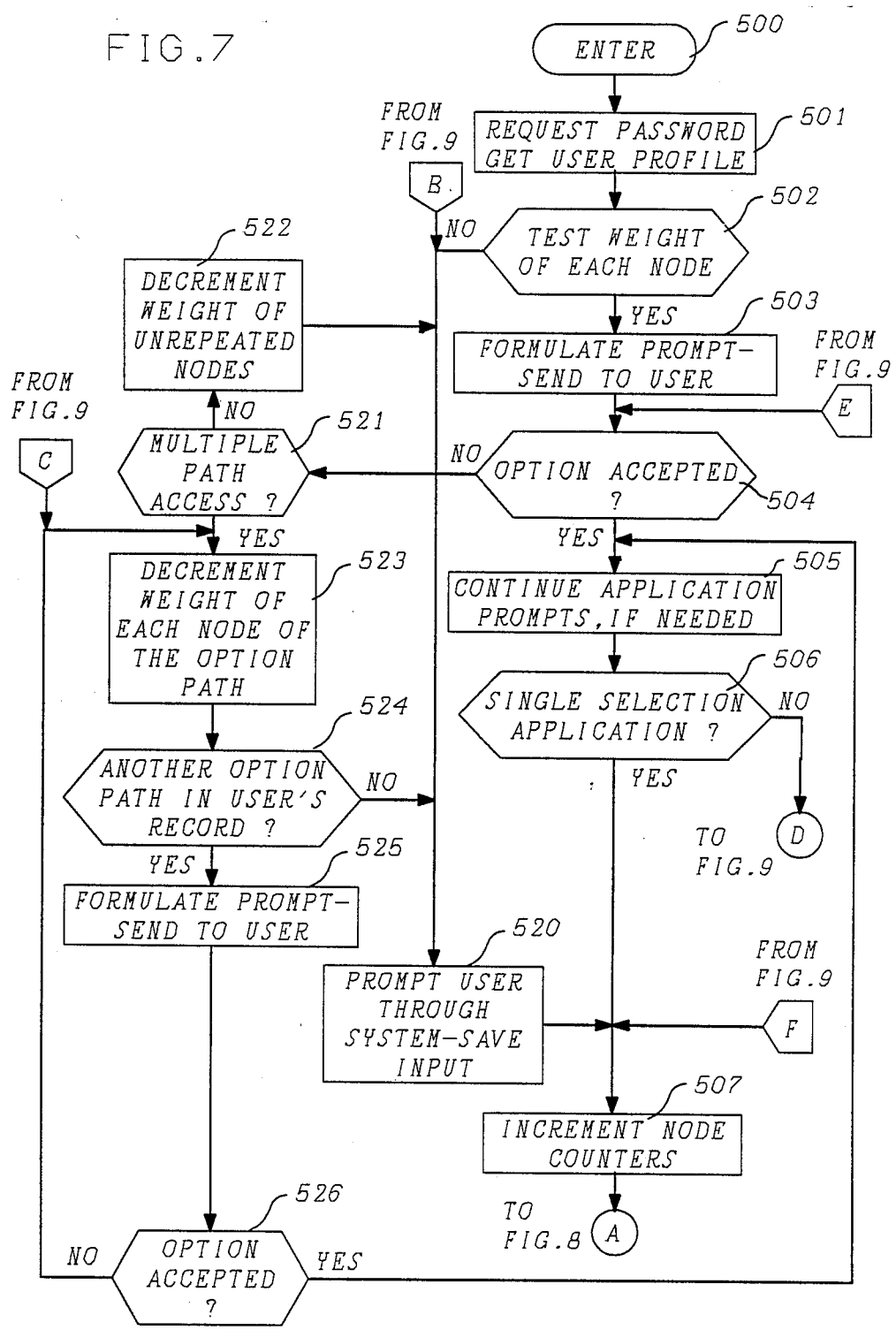
FIGS. 7–9 illustrate flow charts of the program which controls the operation of the system of FIG. 1 in accordance with the principles of the invention.

Turning then to FIG. 7, when the program is entered at block 500 it proceeds to block 501 where it causes converter 30 to output an announcement requesting that the user enter his/her password, in the manner described above. Upon receipt of the last digit of the user's password, the program translates the password into an index, which is then added to the address of a predetermined memory 20 location to identify the address at which the user's record, or profile, is stored. The program then proceeds to block 502 upon retrieving the user's record.

At block 502, the program tests the weight of each node identified in the record and transfers to block 503 if at least one of the weights equals or exceeds it respective threshold. Otherwise, the program proceeds to block 520 where it guides the user through the various levels of the telemarketing system, beginning at the root node. The program does this in the manner described above in connection with FIG. 3. In addition, the program stores the user's response to each menu announcement in a respective memory 20 register. The program then proceeds to block 507 after it has advanced the user to the desired service.

At block 503, the program causes converter 30 to supply to the user an announcement inquiring whether the user wishes to excercise the option of advancing to the node identified by the full or partial series of nodes whose weights have exceeded their respective thresholds. That is, the system advances the user to either an intermediate node or to the end point of a path based on which counters have exceeded their thresholds. The program proceeds to block 504 upon completing the foregoing task.

At block 504, the program proceeds to block 505 if the user accepts the option. Otherewise, the program proceeds to block 521. At block 505, the program delivers to the user in the manner described above the announcement associated with the node that the user has been advanced to. The program then proceeds to block 506 where it checks the state of a flag stored at a predetermined RAM 20 memory location to see if the telemarketing system that the program implements is a single selection system. That is, the system does not allow a user to select multiple items from a menu of service offerings. Accordingly, the program proceeds to block 507 if it finds that the flag is set to a particular binary value (e.g., a 1). Otherewise, the program proceeds to block 527 of FIG. 9 if the flag is set to the opposite binary value (e.g. an 0).

Figure 8:
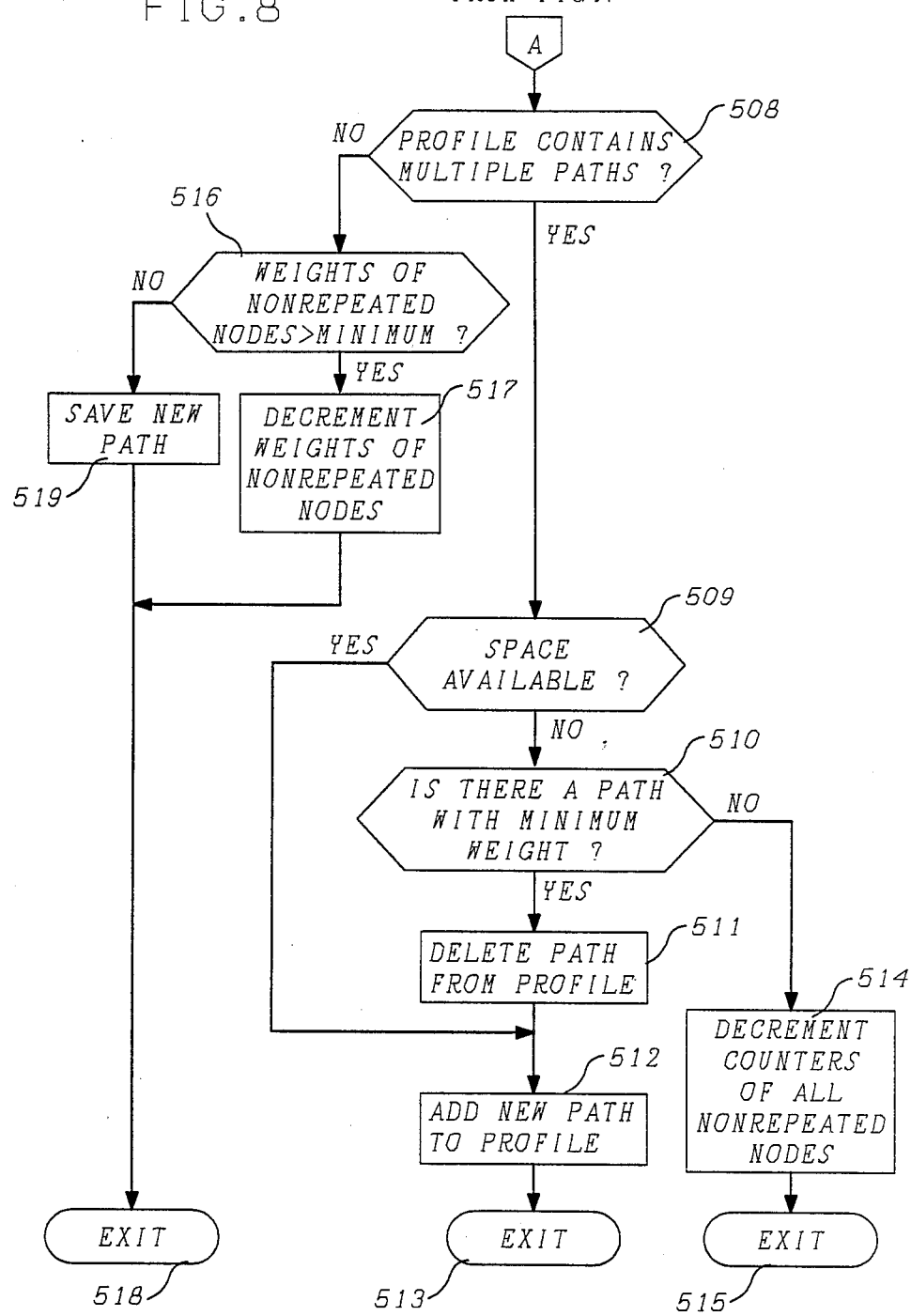

At block 507, the program increments the counters associated with the nodes of the path selected (or advanced) by the user to reach the desired service, as discussed above. The program then proceeds to block 508 shown in FIG. 8. The portion of the program represented by block 508 through 519 handles the case where the user has selected a new path during the current session.

In particular, at block 508, the program checks the user's record (profile) to see if the record contains multiple paths, and then proceeds to block 509 if it finds that to be the case. Otherwise, it proceeds to block 516 where it checks the user's record to see if contains nodes which were previously selected by the user, but which were not selected during the current session. If the user's record contains nodes which were previously selected by the user, but which were not selected during the current session. If the user's record contains such nodes, then the program checks the contents of the associated counters and proceeds to block 517 if such contents exceed a minimum value, for example, the value of the counter's associated increment. Otherwise, the program proceeds to block 519.

At block 517 the program decrements the contents of those counters identified at block 516, and then exits via block 518. At block 519, the program stores in the user's record the identity of the new path that the user selected during the current session, and then exits via block 518.

At block 509, the program checks the user's record to see if there is space available for storing the identity of a new path that the user selected during the current session. The program proceeds to block 512 if it finds that to be the case. Otherwise, the program proceeds to block 510. At block 512, the program stores the new path in the user's record and then exits via block 513. At block 510, the program checks the user's record for a path whose nodes do not exceed a minimum weight. That is, the contents of each of the associated counters do not exceed, for example, the value of their respective increments. The program proceeds to block 511 if the user's record contains such a path. Otherwise, it proceeds to block 514. At block 511, the program deletes the minimum weight path from the user's record and proceeds to block 512. At block 512, the program stores the new path, if any, in the user's record and exits via block 513. At block 514, the program performs the function described for block 517 and then exits via block 515.

As mentioned above, if the user rejects the path option offered at block 503 of FIG. 7, then the program proceeds to block 521 via block 504. At block 521, the program proceeds to block 523 if the system that it implements allows the user to establish multiple paths. Otherwise, the program proceeds to block 522 where it decrements the contents of the counters of the nodes making up the path that was offered to the user at block 503, and proceeds to block 520.

At block 523, the program decrements the counters in the manner described for block 522 and then proceeds to block 524. At block 524, the program proceeds to block 525 if finds that the user's record contains another optional (multiple) path having nodes whose weights exceed their respective thresholds. Otherwise, the program proceeds to block 520 where it prompt the user through the system nodes. At block 525, the program, in the manner discussed above, extends to the user the option of selecting the other option path. The program then proceeds to block 526 to await the user's response. If the user accepts the option, then the program proceeds from block 526 to block 505 to continue the application. Otherwise, the program proceeds to block 523 to see if the user's record contains still another option path which may be offered to the user.

Figure 9:
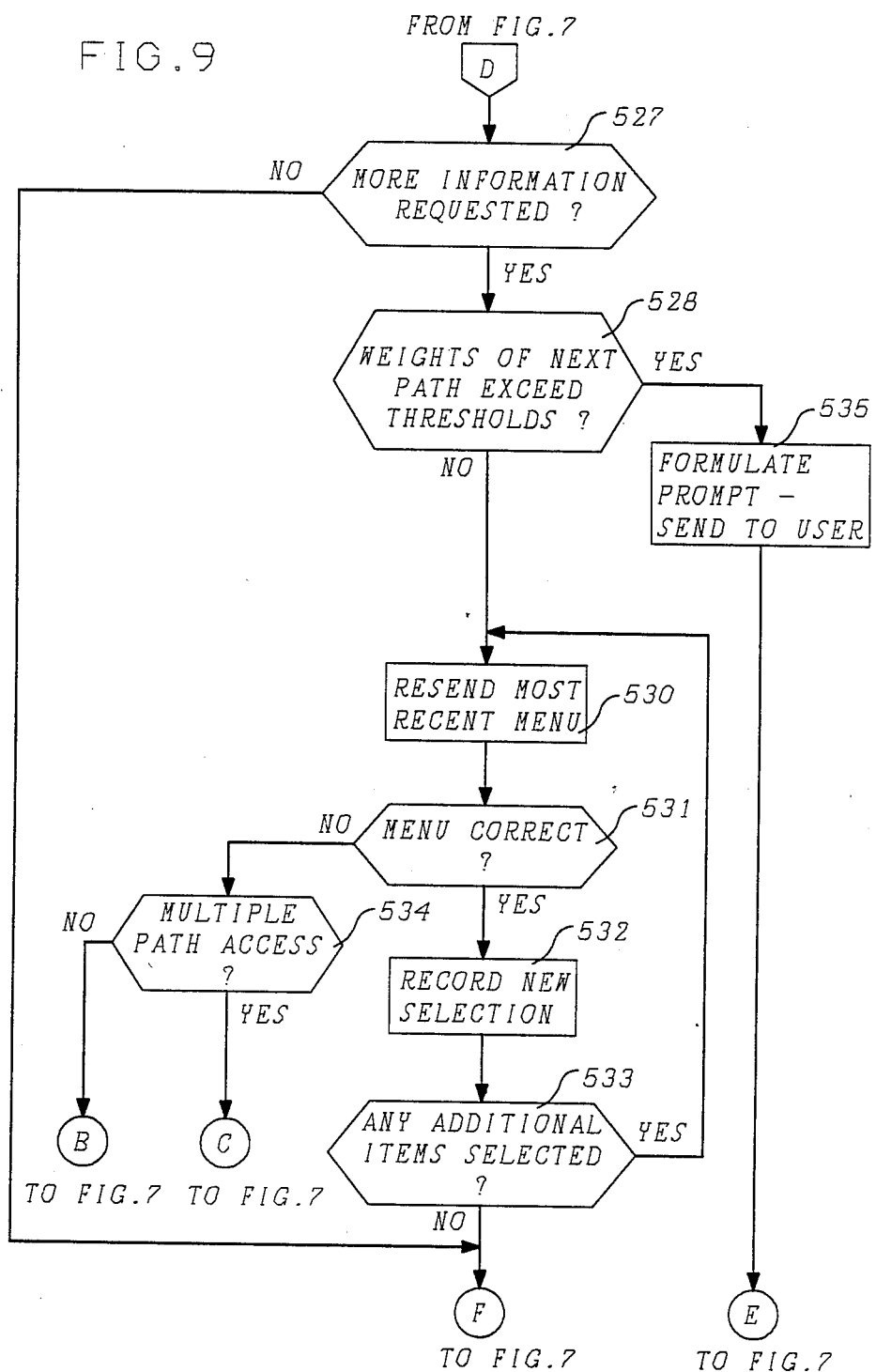

As mentioned above, the program at block 506 proceeds to block 527 of FIG. 9 if the system allows a user to select multiple items from a menu provided at the service level.

Specifically, at block 527 the program formulates an announcement, for example, announcement (6) described above, to inquire whether the user desires to select additional items. The program proceeds to block 528 if the user's response is affirmative. Otherwise, the program proceeds to block 507. At block 528, the program proceeds to block 535 if it finds that the user's record contains one or more menu items whose nodes exceed their respective thresholds. At block 535, the program advances the user to the service points identified by such menu items by delivering to the user an appropriate announcement, such as, for example, announcement (5) described above.

The program, on the other hand, proceeds to block 530 if it does not find such menu items. At block 530, the program sends to the user the most recent menu of items (e.g.) announcement (4)) and then proceeds to block 531. At block 531, the user selects an item from the menu or requests other information. If the user selects an item then the program proceeds to block 532 to record the user's selection. The program then sends to the user the service announcement identified by the user's selection. The program then proceeds to block 533 at the completion of the announcement. At block 533, the program prompts the user to determine if the user desires to select additional items and proceeds to block 530 if the user's response thereto is affirmative. Otherwise, the program proceeds to block 507 of FIG. 7.

If, at block 531, the program finds that the user has rejected the menu of items provided at block 530, then it proceeds to block 534. At block 534, the program proceeds to block 523 if the user's record contains at least one other multiple path. Otherwise, the program proceeds to block 520.

Figure 10:
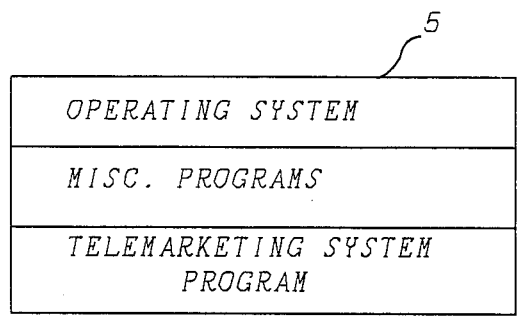
FIGS. 10 and 11 illustrate the layout of the ROM and RAM memories of FIG. 1, respectively.

We now turn our attention to FIG. 10 which illustrates a layout of the (a) CPU 10 operating system; (b) miscellaneous programs, such as so-called maintenance programs and call processing programs; and (c) program which implements the telemarketing system, discussed above, as stored in memory 5.

Figure 11:
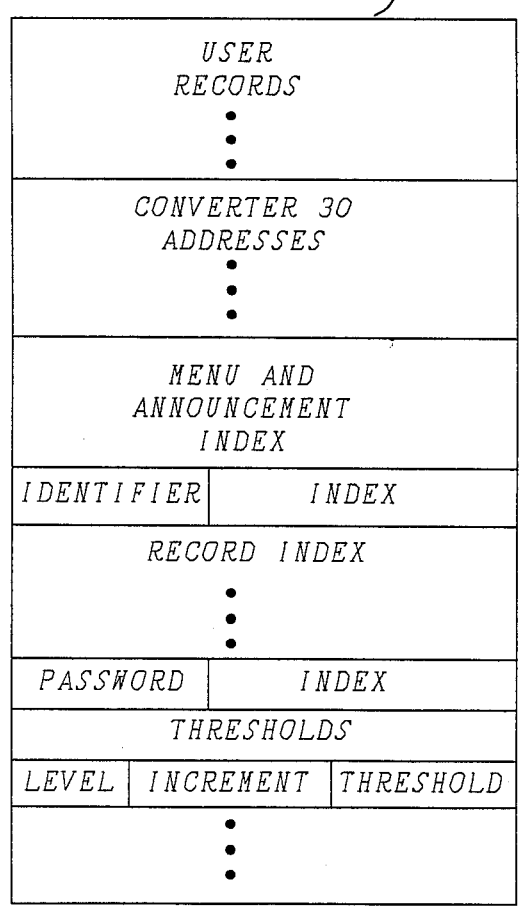

Similarly, FIG. 11 illustrates a layout of the (a) user records; (b) converter 30 memory addresses; (c) announcement index, in which each index comprises two fields, an identifier field in which is stored the identity of a node or a series of nodes, e.g., the series 115, and an index field pointing the memory 20 location containing the address of the associated converter 30 memory address; (d) record index in which each index comprises two fields, a password field for storing a respective password and an associated index field for storing a number which is added to a particular memory 20 address to identify the memory location containing the user's record; (e), thresholds, in which each threshold location comprises three fields, namely a level field for storing the identity of a respective level, e.g., level one, an increment field for storing the value of the associated increment, e.g., a 10, and a threshold field for storing the value of the associated threshold, e.g., 30.

Although a specific embodiment of this invention has been shown and described, it will be understood that various modifciations may be made without departing from the scope and spirit of this invention. For example, my invention may be adapted to any telemarketing system in which there is a need to establish a path from an originating point to a terminating point. As such, the scope of my invention may therefore encompass various switching arrangements.

I claim:

1. Apparatus for use in a system of the kind which establishes a path from a common point to a desired service offering based on a user of said system entering a sequence of characters identifying said path, said path being one of a plurality of paths contained within said system, said apparatus comprising means responsive to receipt of each of said sequence of characters for storing said characters in the order that they are received in a record associated with said user, each character of said stored sequence of characters being associated with a respective weight, means for advancing said user to an end point of said one path as identified by the received sequence of characters, and means thereafter operative each time said user subsequently accesses said system for extending to said user an option to advance to the end point of said one path when the weight of each character of said sequence at least equals the value of a respective threshold as a result of said user's pattern of past usage of said system.

2. The apparatus set forth in claim 1 wherein said means for extending includes means operative when the weight of at least one of the characters of said stored sequence is less that the value of its respective threshold for extending to said user the option to advance to the end point of a path identified by a leading series of said sequence of characters when the weight of each character forming said leading series is at least equal to its respective threshold.

3. The apparatus set forth in claim 2 wherein said path identified by said series of characters is a subpath of said one path.

4. The apparatus set forth in claim 1 wherein said means for storing also includes means for storing in said user's record at least another sequence of characters identifying another one of said paths, and wherein said means operative for extending includes means operative for extending to said user the option of advancing to the end point of said other path in the event that said user rejects the option to advance to the end point of said one path.

5. Apparatus for establishing a customized path contained within a telemarketing system, said customized path being one of a plurality of such paths identified by repective predetermined sequences of characters, said apparatus comprising means responsive to receipt of each character of one of said sequences entered by a user of said system for storing each received character in a respective field of a record associated with said user so as to form a sequence of characters comprising the received character and each previously received character and for advancing said user to an end point of the path identified by the current sequence of received characters, each of said stored sequence of characters being associated with a respective weight, means thereafter operative each time said user subsequently accesses said system for advancing said user to the end point of the path identified by the first N characters of said stored one sequence of characters when the weight of each of said first N characters at least equals a respective predetermined threshold as a result of said user accessing said system on prior occasions and entering said one sequence of characters, where $N \geq 1$.

6. The apparatus set forth in claim 5 wherein said path identified by said first N characters is the path identified by said one sequence of characters when the weight of each character of that sequence at least equals its repective threshold.

7. The apparatus set forth in claim 5 wherein said path identified by said first N characters is a subpath of the path identified by said one sequence of characters.

8. The apparatus set forth in claim 5 wherein said means for storing also includes means for storing in said user's record at least one another sequence of characters entered by said user, said other sequence of characters identifying another one of said paths, and wherein said means operative for advancing includes means for advancing said user to the end point of said other one of said paths in the event that said user rejects being advanced to the end point of the path identified by said first N characters.

* * * * *

UNITED STATES PATENT AND TRADEMARK OFFICE
CERTIFICATE OF CORRECTION

PATENT NO.  : 4,932,021
DATED       : June 5, 1990
INVENTOR(S) : Taryn S. Moody

It is certified that error appears in the above-identified patent and that said Letters Patent is hereby corrected as shown below:

Line 3 of the Abstract, "peach" should read --reach--.
Column 1, line 16, "and" should read --an--.
Column 6, line 20, "the" (second occurrence) should read --to--.
Column 7, line 46, "abobve" should read --above--.
Column 7, line 51, after "given" insert --the--.
Column 8, line 16-17, "At the completion of the service point defined by the path" should be deleted.
Column 9, lines 20-24, "If the user's record contains nodes which were previously selected by the user, but which were not selected during the current session." should be deleted.
Column 10, line 62, after "pointing" insert --to--.
Column 12, line 44, delete "one".

Signed and Sealed this

Eighth Day of October, 1991

*Attest:*

HARRY F. MANBECK, JR.

*Attesting Officer*     *Commissioner of Patents and Trademarks*